United States Patent
Kim et al.

(10) Patent No.: US 11,001,918 B2
(45) Date of Patent: May 11, 2021

(54) HIGH-STRENGTH HOT-DIP GALVANIZED STEEL SHEET HAVING EXCELLENT PLATING SURFACE QUALITY AND ADHESION, AND METHOD OF MANUFACTURING THE SAME

(71) Applicant: POSCO, Pohang-si (KR)

(72) Inventors: Myung-Soo Kim, Gwangyang-si (KR); Jong-Sang Kim, Gwangyang-si (KR); Young-Ha Kim, Gwangyang-si (KR); Joong-Chul Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 432 days.

(21) Appl. No.: 15/852,629

(22) Filed: Dec. 22, 2017

(65) Prior Publication Data

US 2018/0119263 A1 May 3, 2018

Related U.S. Application Data

(62) Division of application No. 14/369,577, filed as application No. PCT/KR2012/011539 on Dec. 27, 2012, now abandoned.

(30) Foreign Application Priority Data

Dec. 28, 2011 (KR) .......................... 10-2011-0145233

(51) Int. Cl.
*C23C 2/00* (2006.01)
*C23C 2/02* (2006.01)
(Continued)

(52) U.S. Cl.
CPC .............. *C23C 2/02* (2013.01); *B32B 15/011* (2013.01); *B32B 15/013* (2013.01); *C21D 9/46* (2013.01);
(Continued)

(58) Field of Classification Search
CPC .................................. C23C 2/00; C23C 28/00
See application file for complete search history.

(56) References Cited

U.S. PATENT DOCUMENTS

| | | | |
|---|---|---|---|
| 5,447,802 A | 9/1995 | Tobiyama et al. | |
| 2002/0160221 A1* | 10/2002 | Takeda | C25D 5/48 |
| | | | 428/659 |

(Continued)

FOREIGN PATENT DOCUMENTS

| | | |
|---|---|---|
| EP | 2009127 | 12/2008 |
| EP | 2224033 | 9/2010 |

(Continued)

OTHER PUBLICATIONS

JP2007262464A English translation, Google patent, 2020. (Year: 2020).*

(Continued)

*Primary Examiner* — Hai Y Zhang
(74) *Attorney, Agent, or Firm* — Cantor Colburn LLP (57) ABSTRACT

Provided is a method of manufacturing a hot-dip galvanized steel sheet. According to an aspect of the present invention, the method may include preparing a base steel sheet, forming a iron (Fe)-plated layer on the prepared base steel sheet, oxidation heating the steel sheet having the Fe-plated layer formed thereon at a temperature ranging from 600° C. to 800° C., maintaining the heated steel sheet at a temperature ranging from 750° C. to 900° C. for 5 seconds or more in a reducing atmosphere with a dew point of between −30° C. to 5° C. including 20 ppm or less of oxygen, 1 vol % to 20 vol % of $H_2$, and $N_2$ as well as unavoidable gases as a remainder, cooling the maintained steel sheet, and plating the cooled steel sheet by dipping in a hot-dip galvanizing bath.

7 Claims, 4 Drawing Sheets

(51) Int. Cl.

| | | |
|---|---|---|
| *C23C 2/06* | (2006.01) | |
| *C25D 5/48* | (2006.01) | |
| *C25D 7/06* | (2006.01) | |
| *C23C 28/00* | (2006.01) | |
| *C21D 9/46* | (2006.01) | |
| *C23C 2/28* | (2006.01) | |
| *B32B 15/01* | (2006.01) | |
| *C22C 38/02* | (2006.01) | |
| *C22C 38/04* | (2006.01) | |
| *C22C 38/06* | (2006.01) | |
| *C23C 2/40* | (2006.01) | |
| *C25D 3/20* | (2006.01) | |

(52) U.S. Cl.
CPC .............. *C22C 38/02* (2013.01); *C22C 38/04* (2013.01); *C22C 38/06* (2013.01); *C23C 2/06* (2013.01); *C23C 2/28* (2013.01); *C23C 2/40* (2013.01); *C23C 28/322* (2013.01); *C23C 28/3225* (2013.01); *C23C 28/345* (2013.01); *C23C 28/36* (2013.01); *C25D 5/48* (2013.01); *C25D 7/0614* (2013.01); *C25D 3/20* (2013.01); *Y10T 428/12799* (2015.01)

(56) References Cited

U.S. PATENT DOCUMENTS

| 2008/0283154 | A1 | 11/2008 | Taniguchi et al. |
| 2001/0186854 | | 7/2010 | Bertrant et al. |
| 2011/0008546 | A1* | 1/2011 | Suzuki .................. C22C 38/60 427/431 |

FOREIGN PATENT DOCUMENTS

| JP | 05148604 | | 6/1993 |
| JP | 05247617 | | 9/1993 |
| JP | 06128758 | | 5/1994 |
| JP | 10046304 | | 2/1998 |
| JP | 2769350 | | 4/1998 |
| JP | 2001226742 | | 8/2001 |
| JP | 2002322551 | | 11/2002 |
| JP | 2004211157 | | 7/2004 |
| JP | 2005200690 | | 7/2005 |
| JP | 2007262464 | | 10/2007 |
| JP | 2007262464 A | * | 2/2012 |
| KR | 1020060074364 | | 7/2006 |
| KR | 1020100030627 | | 3/2010 |
| KR | 1020100073819 | | 7/2010 |

OTHER PUBLICATIONS

European Search Report—European Application No. 12862705.6, dated Apr. 25, 2016, citing JP 2007 262464, JP H06 128758, US 2002/160221, EP 2 224 033 and EP 2 009 127.
European Search Report—European Application No. 12862705.6, dated Oct. 6, 2015, citing JP 2007 262464 and JP H06 128758.
International Search Report—PCT/KR2012/011539 dated Apr. 24, 2013.

* cited by examiner

HIGH-STRENGTH HOT-DIP GALVANIZED STEEL SHEET HAVING EXCELLENT PLATING SURFACE QUALITY AND ADHESION, AND METHOD OF MANUFACTURING THE SAME

TECHNICAL FIELD

The present invention relates to a hot-dip galvanized steel sheet used for automobiles, household appliances, and building materials, and a method of manufacturing the same.

BACKGROUND ART

Hot-dip plated steel sheets have been widely used for building materials, various structures, household appliances, and automotive bodies due to their excellent corrosion resistance. The most frequently used hot-dip plated steel sheets at present may be classified as a hot-dip galvanized steel sheet (hereinafter, referred to as "GI steel sheet") and a galvannealed steel sheet (hereinafter, referred to as "GA steel sheet"). Also, development of high-strength steel sheets used as steel sheets for automobiles has been continuously undertaken in the interests of collision safety and the improvement of fuel economy. However, since the ductility of steel sheets relatively decreases when the strength thereof is increased, research into methods of improving the ductility thereof have been carried out.

According to the foregoing methods, recently developed steels may include dual phase (hereinafter, referred to as "DP", ferrite and martensite phase) steels having manganese (Mn), silicon (Si), and/or aluminum (Al) added thereto, complex phase (hereinafter, referred to as "CP", ferrite, martensite, and precipitate phase) steels, TRIP (Transformation Induced Plasticity) steels, and the like. In the case that Mn, Si, and/or Al are added in steels as described above, steel sheets having increased ductility as well as improved strength may be manufactured.

In a typical process of manufacturing a hot-dip galvanized steel sheet, a cold-rolled steel sheet (the so-called "full hard steel sheet") is subjected to pickling for the removal of oils and foreign objects on the surface thereof in a pretreatment process, annealing is performed by heating the steel sheet to a predetermined temperature in an annealing process, the steel sheet is coated with zinc (Zn) by being dipped in a galvanizing bath after being cooled to an appropriate temperature, coating weight is controlled by using an air knife, and a hot-dip galvanized steel sheet is finally manufactured by cooling the coated steel sheet to room temperature.

In a typical hot-dip plating process, since an atmosphere of an annealing furnace in an annealing process of a steel sheet may be controlled to be at a reducing atmosphere with a dew point of −30° C. or less, iron may not be oxidized. However, since a steel sheet containing easily oxidizable Si, Mn, and Al is reacted with a trace of oxygen or water vapor existing in the annealing furnace to form single or complex oxides of Si, Mn, or Al, wettability of zinc is decreased to generate so-called "bare spots" in which the surface of the plated steel sheet is locally or entirely uncoated with zinc. Therefore, surface quality of the plated steel sheet may be greatly deteriorated.

In order to address the foregoing limitations, various techniques have been suggested. Among these techniques, Patent Document 1 provides a hot-dip galvanized or galvannealed steel sheet having excellent plating qualities, in which a steel sheet is oxidized in a direct flame furnace having an oxidative environment through controlling an air-fuel ratio to be in a range of 0.80 to 0.95 in an annealing process to form iron oxide including single or complex oxides of Si, Mn, or Al to a predetermined depth in the steel sheet, the iron oxide is reduced by reduction annealing in a reducing atmosphere, and hot-dip galvanizing is then performed. When the method of reduction after oxidation is used in the annealing process, diffusion of the easily oxidizable elements, such as Si, Mn, or Al, to the surface layer is inhibited by the oxides formed to a predetermined depth from a surface layer of the steel sheet to relatively reduce the single or complex oxides of Si, Mn, or Al in the surface layer, and thus, bare spots may be reduced by the improvement of wettability with respect to zinc in a galvanizing bath. That is, when the steel sheet is heated at a high oxygen partial pressure in which iron is oxidizable, iron is oxidized within a predetermined depth of the surface layer portion to form an oxide layer. Since the elements, more easily oxidizable than iron, existing in the oxide layer are also oxidized to exist as oxides, the elements may no longer diffuse into the surface. However, easily oxidizable components, i.e., Si, Mn, and/or Al, existing in base steel under the oxide layer may diffuse into the surface layer portion according to the increases in heating temperature and time, diffusion may be inhibited at an interface between the base steel and the oxide layer due to the oxides, and instead iron oxide reacts with Si, Mn, and/or Al to reduce the iron oxide as iron, and Si, Mn, and/or Al may form a single Si oxide, a single Mn oxide, a single Al oxide, or complex oxides. Therefore, after the completion of annealing, a reduced iron layer including a portion of single Si oxide, Mn oxide, or Al oxide, or complex oxides exits in a top surface layer and an oxide layer composed of single Si oxide, single Mn oxide, or single Al oxide, or complex oxides is formed thereunder. Since the surface layer portion is mainly composed of a reduced iron component in the case that reduction is performed after oxidation, coating adhesion is excellent during galvanizing, and thus, bare spots may be significantly improved. However, since the oxide layer between the reduction layer and the base steel may be brittle during press working of the steel sheet due to the oxide layer existing under the reduced iron layer, adhesion in this region may significantly decrease.

Patent Document 2 relates to a technique for improving wettability of molten zinc with respect to a high-strength steel sheet containing Mn, Si, and/or Al, and to a technique in which a cold-rolled steel sheet is annealed and cooled to a martensitic transformation temperature, the steel sheet is preplated with one or more of nickel (Ni), iron (Fe), cobalt (Co), tin (Sn), and copper (Cu), and hot-dip plating is then performed thereon. When the steel sheet is annealed and cooled, and then preplated as in the foregoing patent, a preplated layer covers oxides even in the case that the oxides, such as Si, Mn, or Al, are concentrated on a surface of the steel sheet, and thus, deterioration of platability due to the oxides may be resolved. However, since a continuous hot-dip plating process is integrally composed from the annealing process to the hot-dip plating in order to maintain a reducing environment, the technique as in Patent Document 2 must divide the annealing process and the plating process in order to preplate after the annealing and cooling and in this case, facility may be complicated and costs may be significantly increased.

In addition, Patent Document 3, suggested to address the limitations in that the facility of Patent Document 2 is complicated, relates to a technique in which metal is preplated in a pretreatment process before annealing and annealing and plating is then performed. However, an annealing temperature for annealing high-strength cold-rolled steel sheets, such as DP steel, CP steel, and TRIP steel sheets, in a continuous galvanizing line (CGL) is a minimum of 770° C. or more, and, in the case that a steel sheet preplated with Ni, Fe, Co, Sn, and Cu is heated to 750° C. or more, these preplated materials are diffused into the base steel. At this time, a diffusion depth of the preplated materials may be increased as the annealing temperature is higher and the annealing time is longer. When the preplated materials preplated on the surface layer portion of the base steel are diffused into the base steel, the preplated layer on the surface layer portion may be thin or may not exist, and thus, an effect of improving platability may decrease because the diffusion of Si, Mn, and Al into the surface layer may not be prevented.

Patent Document 4 is suggested to inhibit the diffusion of the materials preplated before annealing into the steel during annealing and Patent Document 4 relates to a technique in which diffusion of preplated Ni, Co, and Mo into the steel sheet is prevented when galvanizing is performed within a short period of time of 10 seconds after stainless steel preplated with Ni, Co, molybdenum (Mo) reaches a heating temperature by rapid heating at 100° C./sec or more, and thus, platability is improved by preventing concentration through diffusion of oxidative elements, such as chromium (Cr), Al, and Mn, into the surface thereof. Therefore, when preplated DP steel, CP steel, and TRIP steel are rapidly heated in an annealing furnace and maintained within a short period of time, diffusion of the preplated layer into the steel sheet may be prevented, and thus, concentration of the easily oxidizable elements, such as Si, Mn, or Al, in the surface thereof may be prevented. However, a temperature of 750° C. or more and a minimum of 30 seconds or more may be required in order to secure targeted strength and ductility, and materials in the preplated layer may be easily diffused into the steel sheet during this time, and thus, the effect of inhibiting the concentration of Si, Mn, or Al in the surface thereof by the preplated layer may decrease.

In addition, Patent Document 5 improves plating adhesion in which when preplating of iron on a steel sheet at a coating weight of 10 g/m² before annealing is performed in order to inhibit the diffusion of Si and Mn into the surface thereof during the annealing process and reduction annealing is then performed, Si and Mn in base steel diffuse into a Fe preplated layer but Si and Mn do not diffuse into the surface thereof due to the formation of oxides in the thick preplated layer, and thus, the surface has excellent platability due to the absence of oxides and Si and Mn oxides are also discontinuously dispersed in the prelated layer. When reduction annealing is performed after the formation of the thick Fe preplated layer, Si and Mn existing in the base steel under the preplated layer may not diffuse into the surface thereof, and thus, plating wettability may be excellent because surface oxides are not formed and plating adhesion may also be excellent because oxides are dispersed in the preplating layer. However, the coating weight must be increased to an amount of 10 g/m² in order to inhibit the diffusion of oxidative components, such as Si and Mn, into the surface thereof during the reduction annealing. In this case, an electroplating facility for forming a thick preplated layer may be required to be increased, and accordingly, costs may increase.

Meanwhile, Patent Document 6 provides a method of manufacturing a steel sheet having excellent plating adhesion without bare spots, in which, in the case that reduction annealing is performed after oxidation annealing in order to improve hot-dip platability of high-strength steel containing a large amount of Si, since Si forms an oxide on the surface thereof during the oxidation annealing to prevent the oxidation of Fe, an oxidation layer having sufficient thickness may not be obtained, and thus, the oxidation layer having sufficient thickness may be secured during the oxidation annealing by preplating one of Fe, Ni, carbon (C), sulfur (S), Cu, and Co on a steel sheet before the oxidation annealing and the oxidation and the reduction annealing are subsequently performed, and hot-dip plating is then performed after iron oxide is reduced.

With respect to the steel sheet containing a large amount of Si, a dense Si oxide is preferentially formed on the surface thereof during the oxidation process to prevent the oxidation of a base steel sheet. When preplating is performed as a method of addressing the foregoing phenomenon, the formation of Si oxide on the surface thereof during the subsequent oxidation process may be prevented due to a preplated layer, and thus, a sufficient oxidation layer may be secured. Since a Fe oxide layer is reduced in the subsequent reduction process to have no oxides or a relatively small amount of oxide on the surface of a reduced Fe layer, platability may be excellent and adhesion between the reduced Fe layer and a plated layer may also be excellent when hot-dip plating is performed.

However, when the Fe oxidation layer having a predetermined thickness is formed in the oxidation process and typical reduction annealing is then performed as in Patent Document 6, the formation of an oxide layer, such as Si oxide, Mn oxide, or Al oxide, on the interface between the reduced Fe layer and the base steel may not be avoided. That is, even in the case that plating adhesion and the adhesion between the zinc-plated layer and the reduced Fe layer may be excellent as the formation of Si oxide on the surface of the reduced Fe layer is prevented, the occurrence of delamination may not be avoided because the oxide layer, such as Si oxide, Mn oxide, or Al oxide, formed between the reduced Fe layer and the base steel may be brittle during processing.

(Patent Document 1) Korean Patent Application Laid-Open Publication No. 2010-0030627
(Patent Document 2) Japanese Patent Application Laid-Open Publication No. 2005-200690
(Patent Document 3) Japanese Patent No. 2769350
(Patent Document 4) Japanese Patent Application Laid-Open Publication No. 2005-200690
(Patent Document 5) Japanese Patent Application Laid-Open Publication No. 2002-322551
(Patent Document 6) Japanese Patent Application Laid-Open Publication No. 2007-262464

DISCLOSURE

Technical Problem

An aspect of the present invention provides a technique for securing excellent quality in a plated surface and plating adhesion as well as high strength in a hot-dip galvanized steel sheet by preventing bare spots through the inhibition of the formation of oxides by surface diffusion of difficult to plate elements, such as silicon (Si), manganese (Mn), or aluminum (Al), included in the steel sheet during annealing.

Technical Solution

According to an aspect of the present invention, there is provided a method of manufacturing a hot-dip galvanized steel sheet including: preparing a base steel sheet; forming an iron (Fe)-plated layer on the prepared base steel sheet; oxidation heating the steel sheet having the Fe-plated layer formed thereon at a temperature ranging from 600° C. to 800° C.; maintaining the heated steel sheet at a temperature ranging from 750° C. to 900° C. for 5 seconds or more in an atmosphere with a dew point of between −30° C. to 5° C. including 20 ppm or less of oxygen, 1 vol % to 20 vol % of $H_2$, and $N_2$ as well as unavoidable gases as a remainder; cooling the maintained steel sheet; and plating the cooled steel sheet by dipping in a hot-dip galvanizing bath.

According to another aspect of the present invention, there is provided a hot-dip galvanized steel sheet including: a base steel sheet; and a reduced iron (Fe) layer formed on the base steel sheet and a hot-dip galvanized layer formed on the reduced Fe layer, wherein a total amount of one or more of $SiO_2$ and $Al_2O_3$ at an interface between the reduced Fe layer and the hot-dip galvanized layer in a direction of the base steel sheet is 0.01 g/m² or less, and one or more of silicon (Si) oxide, manganese (Mn) oxide, aluminum (Al) oxide, and a complex oxide thereof having a maximum length of 1 μm or less in a longitudinal direction in a cross section are included within 1 μm from the interface between the reduced Fe layer and the hot-dip galvanized layer in a direction of the base steel sheet.

According to another aspect of the present invention, there is provided a hot-dip galvanized steel sheet including: a base steel sheet; and a reduced iron (Fe) layer formed on the base steel sheet and a hot-dip galvanized layer formed on the reduced Fe layer, wherein a total amount of one or more of $SiO_2$ and $Al_2O_3$ at an interface between the reduced Fe layer and the hot-dip galvanized layer in a direction of the base steel sheet is 0.01 g/m² or less, and one or more of silicon (Si) oxide, manganese (Mn) oxide, aluminum (Al) oxide, and a complex oxide thereof having an average length greater than 0.05 μm and equal to or less than 0.7 μm in a longitudinal direction in a cross section are included within 1 μm from the interface between the reduced Fe layer and the hot-dip galvanized layer in a direction of the base steel sheet.

According to another aspect of the present invention, there is provided a hot-dip galvanized steel sheet including: a base steel sheet; and a reduced iron (Fe) layer formed on the base steel sheet and a hot-dip galvanized layer formed on the reduced Fe layer, wherein a total amount of one or more of $SiO_2$ and $Al_2O_3$ at an interface between the reduced Fe layer and the hot-dip galvanized layer in a direction of the base steel sheet is 0.01 g/m² or less, and the amount of one or more oxides of silicon (Si) oxide, manganese (Mn) oxide, aluminum (Al) oxide, and a complex oxide thereof having a length greater than 1 μm in a cross section included within 1 μm from the interface between the reduced Fe layer and the hot-dip galvanized layer in a direction of the base steel sheet is 10% or less of the amount of total oxides.

Advantageous Effects

According to an aspect of the present invention, a high-strength hot-dip galvanized steel sheet of the plated steel sheet having excellent surface qualities and plating adhesion may be manufactured by preventing surface diffusion and oxidation of silicon (Si), manganese (Mn), or aluminum (Al).

DESCRIPTION OF DRAWINGS

The above and other aspects, features and other advantages of the present invention will be more clearly understood from the following detailed description taken in conjunction with the accompanying drawings, in which.

BEST MODE

Figure 1:
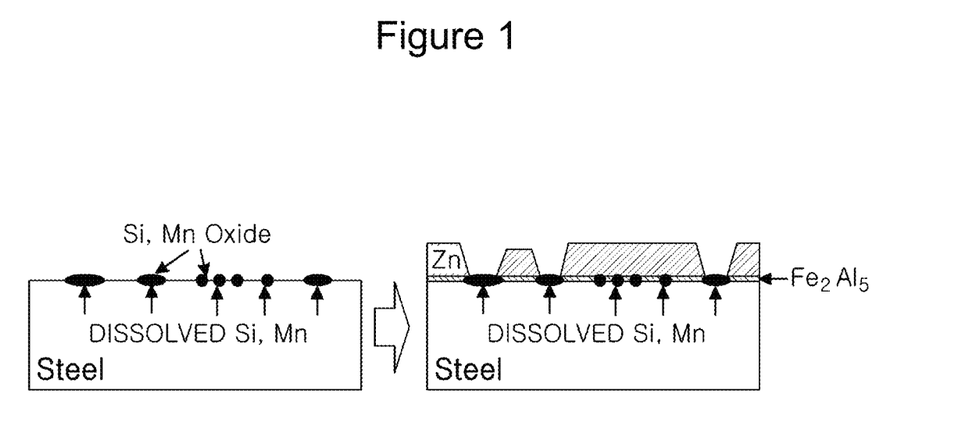
FIG. 1 is a schematic view illustrating a method of manufacturing a typical hot-dip galvanized steel sheet.
Figure 2:
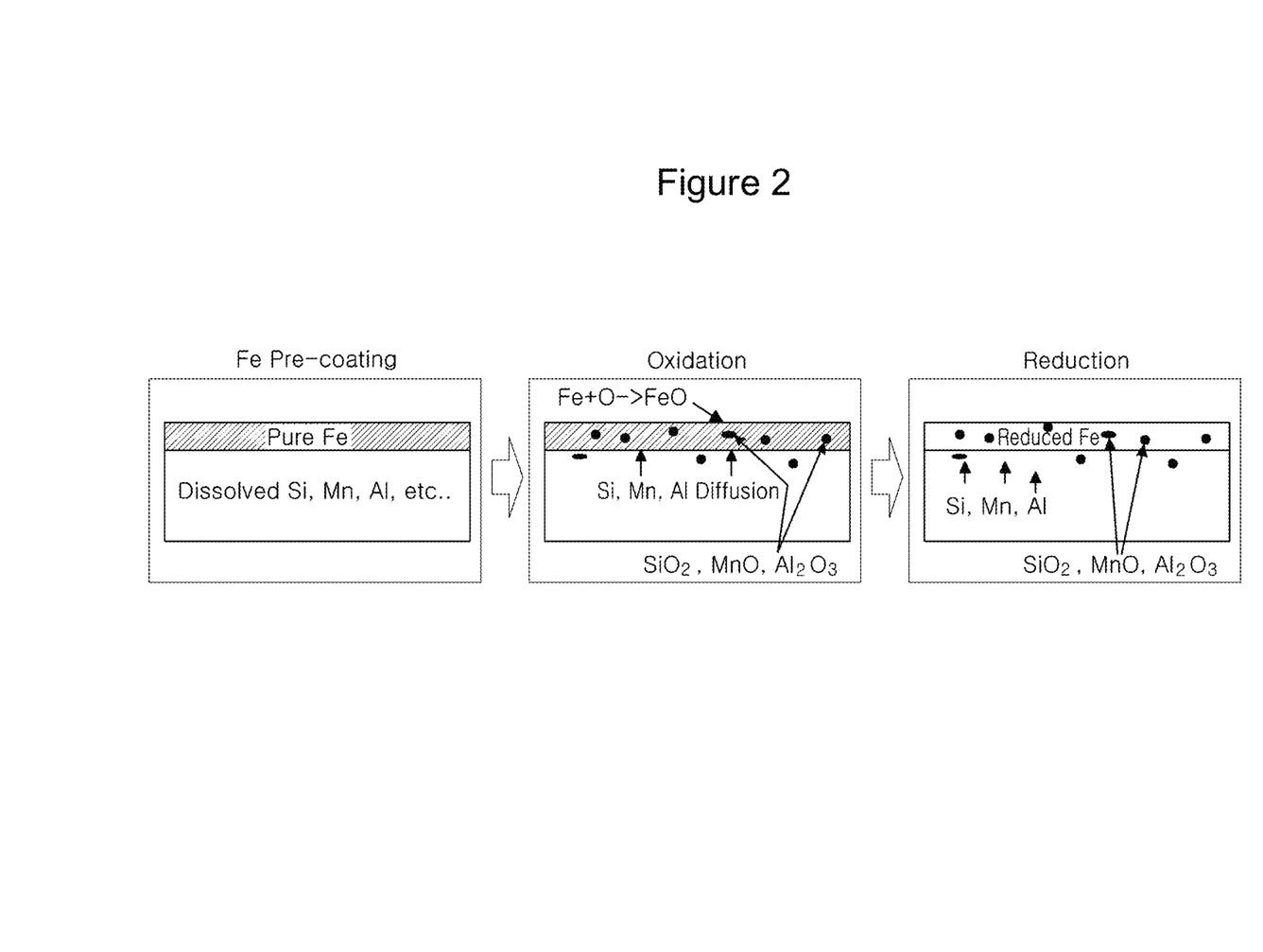
FIG. 2 is a schematic view illustrating a method of manufacturing a hot-dip galvanized steel sheet according to an aspect of the present invention.

The present inventors conducted a significant amount of research into a method that may provide a high-strength hot-dip galvanized steel sheet having excellent platability and plating adhesion. Typically, strength and ductility may be simultaneously improved by adding manganese (Mn), silicon (Si), or aluminum (Al) to a base steel sheet, but, as illustrated in FIG. 1, oxides may be formed at an interface between the base steel sheet and a plated layer to deteriorate platability and plating adhesion during hot-dip galvanizing. Therefore, as illustrated in FIG. 2, the present inventors found that diffusion of difficult to plate elements, such as Si, Mn, or Al, included in the steel sheet into the surface thereof may be prevented by performing a plating process before annealing and sequentially annealing in oxidative and reducing environments, thereby leading to completion of the present invention.

Figure 3:
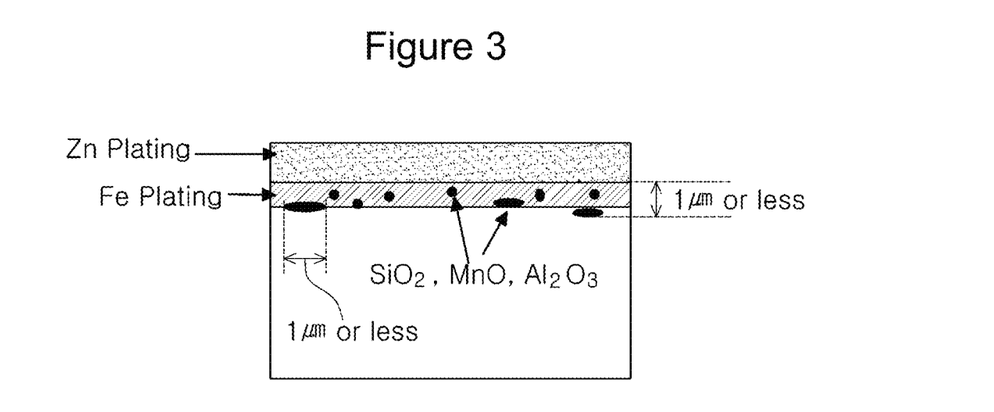
FIG. 3 is a schematic cross-sectional view illustrating the hot-dip galvanized steel sheet according to an aspect of the present invention.

According to an embodiment of the present invention, as illustrated in FIG. 3, a base steel sheet containing difficult to plate elements is plated with iron (Fe) and then oxidized to control a Fe-plated layer to be oxidized, and thus, the diffusion of Si, Mn, or Al into a surface of the steel sheet may be prevented. Thereafter, the steel sheet is reduced in atmospheric gas having a dew point controlled to reduce the Fe-plated layer and simultaneously, oxides composed of one or more of a Si oxide, an Mn oxide, an Al oxide, or a complex oxide thereof is controlled to be dispersed within 1 μm in a direction of the base steel sheet from an interface between the reduced Fe layer and a hot-dip galvanized layer. Therefore, platability and plating adhesion may be secured by improving wettability with respect to zinc (Zn).

Hereinafter, a method of manufacturing a hot-dip galvanized steel sheet according to an aspect of the present invention will be described in detail. Herein, the hot-dip galvanized steel sheet includes a galvannealed steel sheet.

First, a base steel sheet is prepared. The base steel sheet may include one or more selected from the group consisting of Si, Mn, and Al. Since a steel sheet containing less than 1.0 wt % of Si, Mn, or Al may have insignificant amount of an oxide formed on a surface thereof and a steel sheet containing greater than 6.0 wt % thereof may have low practicality, a steel sheet containing 0.5 wt % to 6.0 wt % of Si, Mn, or Al may be appropriate for maximizing an effect of inhibiting the formation of oxides. However, the present invention may be applied in the case that a content of Si, Mn, or Al is lower than the foregoing range, and a lower limit thereof is merely provided because a bare spot phenomenon or a plating delamination phenomenon may be mainly problematic in steels containing a large amount of the foregoing elements. Also, a content of carbon (C) may be 0.3 wt % or less.

In addition, the base steel sheet may include one or more of chromium (Cr), nickel (Ni), copper (Cu), molybdenum (Mo), phosphorous (P), sulfur (S), antimony (Sb), titanium (Ti), niobium (Nb), nitrogen (N), and other unavoidable impurities, added for the purpose of improving strength, ductility, bendability, and hole expandability of the steel sheet. A content of each element is not particularly limited, but the content thereof may be 0.5 wt % or less.

The base steel sheet may be a cold-rolled steel sheet and may be a cold-rolled steel sheet subjected to a pickling process according to a typical pickling method.

A Fe-plated layer may be formed on the prepared base steel sheet. In the case that the Fe-plated layer is absent, single or complex oxides composed of Si, Mn, or Al may preferentially form on a surface layer portion of the steel sheet when the steel sheet is oxidized in a direct flame furnace during a subsequent process and thus, a sufficient oxide layer may be difficult to be obtained because the diffusion of Fe into the surface thereof is prevented due to the oxides even in the case that temperature is increased. Therefore, a considerable amount of single or complex oxides composed of Si, Mn, or Al is formed on the surface of the steel sheet after reduction to decrease platability.

Herein, a coating weight of the Fe-plated layer may be controlled to be in a range of 0.2 g/m$^2$ to 2 g/m$^2$. In the case that the coating weight is less than 0.2 g/m$^2$, since the Fe-plated layer is relatively thin, a portion partially having no Fe-plated layer may exist, and Si, Mn, or Al existing in the surface of the steel sheet may be oxidized in the portion at the initial stage of oxidation annealing and, in a state in which internal oxidation still does not occur at the initial stage of oxidation annealing, oxides may also be formed by the diffusion of Si, Mn, or Al existing just under the surface thereof into the surface thereof. In contrast, even in the case that the coating weight is greater than 2 g/m$^2$, an effect of dispersing internal oxides, an effect of the present invention, may be excellent, but an upper limit thereof may be limited due to economic factors.

At this time, with respect to the Fe plating, an electroplating method may be used due to the better control of the coating weight. Also, since any plating solution bath, such as a water-soluble sulfate bath, chloride bath, or fluoride bath, may be used, a plating solution is not particularly limited.

Thereafter, the steel sheet having the Fe-plated layer formed thereon may be oxidized. Fe is oxidized from the surface layer portion of the Fe-plated layer to form a Fe oxide layer and a thickness of the Fe oxide layer increases as the temperature increases. Simultaneously, Si, Mn, or Al existing in the base steel just under the Fe-plated layer may diffuse into the Fe-plated layer as the temperature increases. In the case that Si, Mn, or Al diffusing into the surface layer reaches the Fe oxide layer, Si, Mn, or Al may not further diffuse into the surface layer, but may be oxidized to form oxides in the steel sheet. Since the internal oxides formed by oxidation after the Fe plating may have partially different diffusion rates, the internal oxides may be non-uniformly formed in the preplated layer.

Herein, the oxidation process may be performed at a temperature ranging from 600° C. to 800° C. Also, a flame furnace is heated from room temperature and a maximum temperature thereof may be limited to a range of 600° C. to 800° C. In the case that the temperature is less than 600° C., sufficient oxidation may not occur within a limited period of time due to slow oxidation reaction rate of Fe. In the case in which the temperature is greater than 800° C., a depth of the internal oxide from the surface layer portion of the base steel in the cross section of the plated steel sheet limited in the present invention is greater than 1 μm due to the excessively thick oxidation layer and thus, the temperature may be limited to be within a range of 600° C. to 800° C. Herein, a direct flame furnace or a radiant tube flame furnace may be used.

In the case that the direct flame furnace is used, an air-fuel ratio may be controlled to be $(1100/(C^{0.09} \times T))+(100/T) \leq$ air-fuel ratio $\leq (1450/(C^{0.09} \times T))+(100/T)$ (where C is coating weight of Fe-plated layer (mg/m$^2$) and T is temperature (° C.) of the direct flame furnace). The air-fuel ratio denotes a ratio of air to fuel.

The air-fuel ratio must be differently controlled according to the coating weight of the Fe-plating layer and the temperature of the flame furnace. That is, in the case that the coating weight of the Fe-plating layer is low, an oxidation rate of the Fe-plated layer is slow when oxygen in the flame furnace is low and thus, the air-fuel ratio must be increased, because diffusion of oxidative components, such as Si, Mn, or Al, in the base steel into the surface of the Fe-plated layer may be facilitated before the Fe-plated layer is sufficiently oxidized. In contrast, in the case that the coating weight of the Fe-plating layer is high, the air-fuel ratio may be relatively low, because the diffusion of the oxidative components, such as Si, Mn, or Al, in the base steel into the surface of the Fe-plated layer may take some time even in the case that the oxidation rate of the Fe-plated layer is slow.

Similarly, in the case that the temperature of the flame furnace is low, the air-fuel ratio must be increased due to the slow oxidation rate of the Fe-plated layer. In contrast, in the case that the temperature of the flame furnace is high, the oxidation rate is fast. Since the thickness of the oxidation layer is excessively increased when the air-fuel ratio is increased, the air-fuel ratio must be relatively decreased.

In the case that the air-fuel ratio is lower than a lower limit value of the present invention, $(1100/(C^{0.09} \times T))+(100/T)$, oxidation of the Fe-plated layer may be insufficient, and thus, an effect of inhibiting the diffusion of the oxidative components, such as Si, Mn, or Al, in the base steel into the surface thereof, expected in the present invention, may be low. In the case that the air-fuel ratio is greater than an upper limit value, $(1450/(C^{0.09} \times T))+(100/T)$, the oxidation layer is excessively thick, and thus, sufficient reduction may be difficult in the subsequent reduction process or delamination may occur while passing through rolls in an annealing furnace because pores may exist in the reduction layer even in the case that sufficient reduction is performed.

In the case that the radiant tube flame furnace is used, the oxidation process may be performed in an atmosphere including 5 vol % or less of H$_2$ and 20 ppm or less of O$_2$ as well as N$_2$ as a remainder, and an oxygen content in an oxidation region in the radiant tube flame furnace may be controlled to be $(4000/(C^{0.2} \times T^{0.08}))+(3500/T) \leq$ oxygen content (ppm) $\leq (5800/(C^{0.2} \times T^{0.08}))+(3850/T)$ (where C is coating weight of Fe-plated layer (mg/m$^2$), T is temperature (° C.) of the radiant tube flame furnace).

In the case that the Fe-plated steel sheet is oxidized in the radiant tube flame furnace, an oxidation rate and a thickness of an oxidation layer after the completion of oxidation may vary according to the oxygen content in the flame furnace and temperature.

In the case that Fe coating weight is low, the oxidation rate of the Fe-plated layer is low when the oxygen content in the flame furnace is low. Since the oxidative components, such as Si, Mn, Al, in the base steel may easily diffuse into the surface of the Fe-plated layer before the Fe-plated layer is sufficiently oxidized, the oxygen content must be increased. In contrast, in the case that the Fe coating weight is high, since the diffusion of the oxidative components, such as Si, Mn, or Al, in the base steel into the surface of the thick Fe-plated layer may take some time, even in the case in which the oxidation rate of the Fe-plated layer is low, the oxygen content may be relatively low.

Similarly, in the case that the temperature of the flame furnace is low, the oxygen content must be increased due to the low oxidation rate of the Fe-plated layer. In contrast, in the case that the temperature of the flame furnace is high, since the oxidation rate is fast, the oxidation layer may become excessively thick when the oxygen content is increased.

In the case that the oxygen content is lower than a lower limit value of the present invention, $(4000/(C^{0.2} \times T^{0.08}))+(3500/T)$, oxidation of the Fe-plated layer may be insufficient, and thus, the effect of inhibiting the diffusion of the oxidative components, such as Si, Mn, or Al, in the base steel into the surface thereof, expected in the present invention, may be low. In the case that the oxygen content is greater than an upper limit value thereof, $(5800/(C^{0.2} \times T^{0.08}))+(3850/T)$, the oxidation layer may be excessively thick, and thus, sufficient reduction may be difficult in the subsequent reduction process or delamination may occur while passing through the rolls in the annealing furnace because pores may exist in the reduction layer even in the case that sufficient reduction is performed.

Thereafter, the steel sheet having the oxidation completed may be maintained in a reducing atmosphere. The reducing atmosphere may be controlled by using an atmospheric gas including 20 ppm or less of oxygen, 1 vol % to 20 vol % of $H_2$, water vapor with a dew point of between $-30°$ C. and $5°$ C., and $N_2$ as well as unavoidable gases as a remainder. In the case that oxygen is absent in the reducing gas, reduction may be more facilitated. However, a trace of oxygen may exist in the introduced nitrogen and hydrogen, and air may also be introduced through a gap in the facility, and thus, controlling of the reducing atmosphere to have absolutely no oxygen may be difficult. In the case that the oxygen content is 20 ppm or less, the effect of the present invention may be obtained. However, since the oxidation layer oxidized in the direct flame furnace may not be sufficiently reduced in the case that the oxygen content is greater than 20 ppm, the oxygen content may be controlled to be 20 ppm or less. Also, in the case that a hydrogen content in the reducing gas is less than 1%, the Fe oxide layer is not sufficiently reduced and a portion thereof remains in an unreduced state, and thus, defects in wettability with respect to zinc or plating delamination may occur. Even in the case that the hydrogen content is greater than 20%, the effect of the present invention may not be affected, but costs and explosion risk may increase as the hydrogen content increases. For example, the hydrogen content of the present invention may be controlled to be in a range of 3 vol % to 10 vol %.

Also, a content of the water vapor in the reduction flame furnace may determine size and distribution of the oxides in the Fe-plated layer. That is, the water vapor may be included in such an amount that may internally oxidize Si, Mn, or Al existing under the reduced Fe layer while reducing Fe oxides formed on the surface in the oxidation process during reduction heating.

In the case that the content of the water vapor is greater than a dew point of $5°$ C., the Fe oxide layer oxidized during the oxidation process may be insufficiently reduced. In the case that the dew point is lower than $-30°$ C., internal oxidation of Si, Mn, or Al may be difficult and thus, Si, Mn, or Al may continuously diffuse into an interface between the base steel and the reduced Fe layer to form an oxide layer composed of Si, Mn, or Al at the interface therebetween. When a cross section of the steel sheet having the reduction completed is observed, the oxide layer including oxides having a length greater than 1 μm in a longitudinal direction may be formed in a layer shape under the reduced Fe layer in a direction parallel to the surface of the steel sheet. Since the oxide layer having a layer shape may be brittle during processing, delamination may occur during the forming of the steel sheet.

In addition, a temperature of reducing Fe oxide in the reducing atmosphere is $600°$ C. or more, but the temperature may be controlled to be maintained in a range of $750°$ C. to $900°$ C., in order to secure material quality of steels. Also, in the case that a maintaining time is less than 5 seconds, sufficient reduction may not occur and thus, the maintaining time may be controlled to be 4 seconds or more. In the case that the maintaining time is 80 seconds or more, the effect of the present invention may be saturated and thus, an upper limit thereof may be controlled to be 80 seconds.

Reduced Fe may exist in the surface layer portion of the steel sheet having the reduction completed and oxides composed of one or more of Si oxide, Mn oxide, Al oxide, or complex oxide thereof may be dispersed in thickness and width directions within 1 μm from the interface between the reduced Fe layer and the hot-dip galvanized layer in a direction of the base steel sheet. In the case that hot-dip plating is performed on the steel sheet by dipping in a galvanizing bath at a temperature ranging from $440°$ C. to $480°$ C., single or complex oxides composed of Si, Mn, or Al may not be formed or a trace thereof may be formed on the surface, and thus, bare spots may not occur because wettability with respect to zinc may be excellent. Also, since the internal oxides having a maximum length of 1 μm or less in a longitudinal direction are dispersed, a steel sheet having excellent adhesion even during bending of the hot-dip galvanized steel sheet may be provided.

The steel sheet having the reduction completed may be cooled. The cooling process is not particularly limited, and any method may be used so long as a cooling effect intended in the present invention may be provided.

A hot-dip galvanizing process may be performed on the cooled base steel sheet by dipping in a plating bath. A method of forming the plated layer is not particularly limited. However, a temperature of the plating bath may be controlled to be in a range of $440°$ C. to $480°$ C. In the case that the temperature of the plating bath is less than $440°$ C., wettability between zinc and the steel sheet may decrease, and in the case that the temperature of the plating bath is greater than $480°$ C., a dissolving rate of the base steel in the plating bath may increase to accelerate the generation of dross in the form of a Fe—Zn compound and thus, cleanliness of the plating bath may be deteriorated.

Galvannealing may be further performed on the hot-dip galvanized steel sheet after the plating process. A sufficient content of Fe in the Zn-plated layer may be secured by controlling a temperature of the galvannealing to be $480°$ C. or more, and a powdering phenomenon, in which a plated layer is delaminated during processing due to the excessive content of Fe in the plated layer, may be prevented by controlling the temperature of the galvannealing to be $650°$ C. or less.

Hereinafter, a hot-dip galvanized steel sheet according to another aspect of the present invention will be described in detail. Herein, the hot-dip galvanized steel sheet includes a galvannealed steel sheet.

The hot-dip galvanized steel sheet may include a base steel sheet. The base steel sheet may include 0.3 wt % or less of carbon (C). The base steel sheet may include one or more selected from the group consisting of Si, Mn, and Al. A steel sheet containing less than 1.0 wt % of one or more of Si, Mn, and Al may have an insignificant amount of oxide formed on a surface of the steel sheet and a steel sheet containing greater than 6.0 wt % thereof may have low practicality. Therefore, a total sum of one or more of Si, Mn, and Al may be controlled to be in a range of 1.0 wt % to 6.0 wt %. However, the present invention may be applied in the case that a content of Si, Mn, and Al is lower than the foregoing range, and a lower limit thereof is merely provided, because a bare spot phenomenon or a plating delamination phenomenon may be mainly problematic in steels containing a large amount of the foregoing elements.

In addition, the base steel sheet may include one or more of Cr, Ni, Cu, Mo, P, S, Sb, Ti, Nb, N, and other unavoidable impurities, added for the purpose of improving strength, ductility, bendability, and hole expandability of the steel sheet. Each element may be included in an amount of 0.5 wt % or less.

The hot-dip galvanized steel sheet includes a reduced Fe layer formed on the based steel sheet. The reduced Fe layer is a Fe layer reduced during an annealing process. A total amount of one or more of $SiO_2$ and $Al_2O_3$ at an interface between the reduced Fe layer and the hot-dip galvanized layer in a direction of the base steel sheet is 0.01 $g/m^2$ or less.

One or more of silicon (Si) oxide, manganese (Mn) oxide, aluminum (Al) oxide, and a complex oxide thereof having a maximum length of 1 μm or less in a longitudinal direction in a cross section may be included within 1 μm from the interface between the reduced Fe layer and the hot-dip galvanized layer in a direction of the base steel sheet. The range within 1 μm may be a diffused layer that may include an upper portion of the base steel sheet as well as the reduced Fe layer. In the case that oxides having a length greater than 1 μm in the longitudinal direction are included, delamination may occur in an oxide layer formed in a layer shape and including oxides having a length greater than 1 μm in the longitudinal direction to thus deteriorate plating adhesion. The oxides may be dispersed in thickness and width directions.

Also, one or more of silicon (Si) oxide, manganese (Mn) oxide, aluminum (Al) oxide, and a complex oxide thereof having an average length greater than 0.05 μm and equal to or less than 0.7 μm in a longitudinal direction in a cross section may be included within 1 μm from the interface between the reduced Fe layer and the hot-dip galvanized layer in a direction of the base steel sheet. In the case that the average length of the oxides in the longitudinal direction existing in the steel sheet is less than 0.05 μm, a ratio of existing surface oxides may be relatively high, and thus, wettability with respect to zinc may deteriorate. In the case that the average length of the internal oxides is greater than 0.7 μm, delamination at the oxide layer may occur even in the case in which the maximum length thereof is 1 μm or less. The oxides may be dispersed in thickness and width directions.

In addition, the amount of one or more oxides of silicon (Si) oxide, manganese (Mn) oxide, aluminum (Al) oxide, and a complex oxide thereof having a length greater than 1 μm included within 1 μm from the interface between the reduced Fe layer and the hot-dip galvanized layer in a direction of the base steel sheet may be 10% or less of the amount of total oxides. In the case that the amount of oxides having a length greater than 1 μm included in the direction of the base steel sheet is greater than 10% of the amount of total oxides, strength and ductility may be decreased due to the thick oxide layer existing in the direction of thickness.

Also, the oxides may include Fe and traces of easily oxidizable components, and may include Fe and metal having a change in Gibbs free energy (delta G) for 1 mole of oxygen during an oxidation reaction lower than that of Fe in an amount of 30 wt % or less. That is, Fe and all components more easily oxidizable than Fe may be included as a portion of the oxides.

As described above, the plated layer may be formed by a hot-dip galvanizing process, and the hot-dip galvanizing process may be performed under the foregoing plating bath conditions. In the case that the galvannealing is performed, the Fe content in the plated layer may be controlled to be in a range of 7% to 13%.

Hereinafter, the present invention will be described in detail, according to specific examples. However, the following examples are merely provided to allow for a clearer understanding of the present invention, rather than to limit the scope thereof. The scope of the present invention is defined by the appended claims and items reasonably inferable therefrom.

(Examples)

1.2 mm thick transformation induced plasticity (TRIP) steel including 1.5 wt % of Si, 1.6 wt % of Mn, and 0.03 wt % of Al was used as a base steel sheet, and foreign objects and rolling oil on a surface of the base steel sheet were removed and Fe-plated layers were then formed under the conditions listed in the following Table 1. Coating weights of plated layers were measured and the results thereof are presented in the following Table 2. At this time, the coating weights were adjusted by changing electroplating time.

In order to separately analyze the base steel sheet and the coating weight of the plated layer, Fe plating was separately performed by using a Cu plate for each plating condition and each coating weight was measured by analyzing through inductively coupled plasma (ICP) after dissolving Fe plated on the Cu plate. Iron sulfate was mainly used for providing $Fe^{2+}$ ions in a preplating solution and ammonium sulfate was used for providing additional $SO_4^{2-}$ ions as a conductive auxiliary agent.

Samples having the Fe plating completed were oxidized by heating in a direct flame furnace under the conditions listed in the following Table 2 and thereafter, the samples were immediately reduced in a reduction furnace under the reducing conditions listed in the following Table 2. Thereafter, the samples were cooled to 400° C., and overaging was then performed at the same temperature for 120 seconds and the samples were heated to 480° C. Then, the samples were plated by dipping in a galvanizing bath having an effective Al concentration of 0.2% for 5 seconds and coating weight was adjusted to 60 $g/m^2$ based on one side thereof through air wiping.

Surfaces of hot-dip galvanized steel sheets having the plating completed were visually examined and surface qualities were evaluated according to the presence and degree of bare spots. 180 degree bending (0-T bending) was performed and a transparent tape was attached and detached at a bending portion. Then, plating adhesion was evaluated by determining whether the plated layer was detached by the tape. In the case that even a small amount of the plated layer was detached by the tape, plating adhesion was evaluated as poor, and the results thereof are presented in Table 3 below.

Also, in order to measure size and depth of internal oxides, a cross section of the plated steel sheet was milled by using a focused ion beam (FIB) and an interface between the plated layer and the based steel was observed by using a transmission electron microscope (TEM). Types and shapes of oxides at the interface between the plated layer and the based steel were observed in TEM micrographs at a magnification of 100,000 times and the presence and depth of the internal oxides just under a surface layer portion of the base steel were also measured. The presence and types of oxides in the TEM micrographs were analyzed by energy dispersive X-ray spectroscopy (EDX) and it was confirmed that the oxides were Si oxide, Mn oxide, Al oxide, and/or complex oxide of Si, Mn, and Al. Lengths of the internal oxides in a longitudinal direction were measured by continuously photographing three TEM micrographs at a magnification of 100,000 times in a direction of the width of the steel sheet and the longest among the measurements was determined as the maximum length of the internal oxides and the results thereof are presented in the following Table 3.

In addition, in order to measure degree of decreasing tensile strength due to the internal oxides, an air-fuel ratio was controlled to be 0.8 to obtain a non-oxidation atmosphere and tensile strengths (A) were measured by controlling other conditions to be the same as those of each Inventive Example and Comparative Example. Tensile strengths (B) of the samples of each Inventive Example and Comparative Example were measured and fractional reduction in tensile strength was calculated by the following equation.

Fractional reduction in tensile strength (%)=$(B-A)/A \times 100\%$ where the surface qualities were evaluated by the following conditions.
- ⊚: very good (steel sheet having no bare spot over the entire plated steel sheet)
- O: good (steel sheet in which 2 or less of point-shaped bare spots having a diameter of less than 0.5 mm were observed in an area of 100 cm$^2$)
- Δ: poor (steel sheet in which a large number of point-shaped bare spots having a diameter ranging from 0.5 mm to 3 mm were observed)
- X: very poor (steel sheet in which bare spots having a diameter greater than 3 mm were observed)

Figure 4:
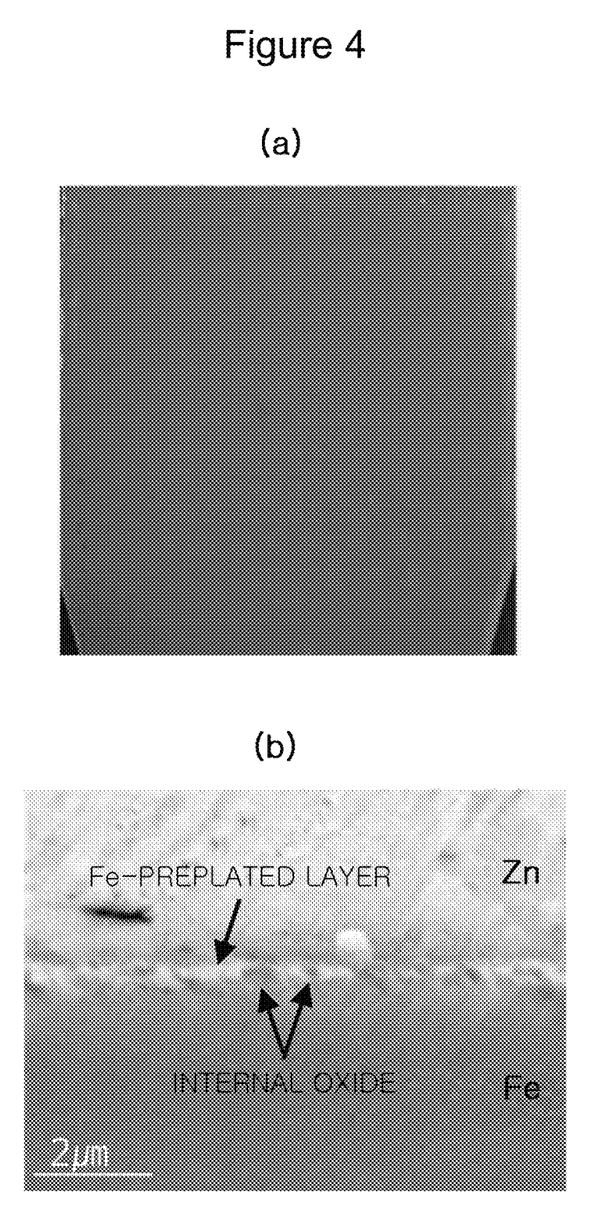
FIG. 4 is (a) a photograph showing a surface and (b) scanning electron microscope (SEM) image showing a cross section of Inventive Example 1, respectively.

In addition, with respect to Inventive Example 1, the cross section thereof was observed by using the TEM, and the results thereof are presented in FIG. 4.

TABLE 1

| Fe$^{2+}$ (g/l) | SO$_4^{2-}$ (g/l) | pH | Current density (A/dm$^2$) | Plating bath temperature (° C.) |
|---|---|---|---|---|
| 40 | 80 | 2.5 | 40 | 60 |

TABLE 2

| Category | Fe coating weight (g/m$^2$) | Direct flame furnace | | Reduction furnace | | | | Plating bath temperature (° C.) |
|---|---|---|---|---|---|---|---|---|
| | | Air-fuel ratio | Heating temperature (° C.) | H$_2$ content (vol %) | Annealing temperature (° C.) | Dew point (° C.) | Maintaining time (sec) | |
| Inventive Example 1 | 0.25 | 1.35 | 700 | 5 | 800 | −10 | 40 | 455 |
| Inventive Example 2 | 0.5 | 1.2 | 700 | 20 | 800 | −10 | 40 | 455 |
| Inventive Example 3 | 0.5 | 1.2 | 750 | 5 | 850 | −10 | 30 | 455 |
| Inventive Example 4 | 0.5 | 1.22 | 750 | 5 | 850 | −10 | 20 | 455 |
| Inventive Example 5 | 1.0 | 1.08 | 800 | 2 | 800 | 0 | 40 | 455 |
| Inventive Example 6 | 1.0 | 1.3 | 640 | 10 | 780 | 0 | 60 | 445 |
| Inventive Example 7 | 1.0 | 1.3 | 640 | 10 | 780 | 0 | 20 | 470 |
| Inventive Example 8 | 2.0 | 1.15 | 700 | 5 | 850 | 0 | 10 | 460 |
| Inventive Example 9 | 2.0 | 1.1 | 750 | 10 | 850 | 0 | 30 | 460 |
| Inventive Example 10 | 0.5 | 1.15 | 650 | 5 | 800 | 5 | 40 | 460 |
| Comparative Example 1 | — | 1.2 | 700 | 5 | 800 | −20 | 40 | 460 |
| Comparative Example 2 | 0.05 | 1.2 | 700 | 5 | 800 | −20 | 40 | 460 |
| Comparative Example 3 | — | 0.85 | 700 | 5 | 800 | −10 | 40 | 460 |
| Comparative Example 4 | 0.5 | 1.6 | 750 | 5 | 800 | 0 | 40 | 460 |
| Comparative Example 5 | 1.0 | 1.3 | 500 | 5 | 800 | −25 | 40 | 460 |
| Comparative Example 6 | 0.5 | 1.3 | 900 | 5 | 850 | −10 | 40 | 460 |
| Comparative Example 7 | 0.5 | 1.3 | 700 | 0.2 | 800 | −20 | 40 | 460 |
| Comparative Example 8 | 0.5 | 1.3 | 700 | 0.5 | 800 | −20 | 1 | 460 |
| Comparative Example 9 | 0.5 | 1.3 | 700 | 5 | 800 | −20 | 40 | 440 |
| Comparative Example 10 | 0.5 | 1.21 | 700 | 5 | 800 | −60 | 40 | 460 |

TABLE 3

| Category | Depth of internal oxides from the surface layer of base steel (μm) | Maximum length of internal oxides in a longitudinal direction just under the surface layer (μm) | Surface quality of hot-dip galvanized steel sheet | Adhesion | Fractional reduction in tensile strength (%) |
|---|---|---|---|---|---|
| Inventive Example 1 | 0.21 | 0.5 | ○ | Excellent | 2 |
| Inventive Example 2 | 0.24 | 0.2 | ⊚ | Excellent | 2.2 |
| Inventive Example 3 | 0.28 | 0.2 | ⊚ | Excellent | 3 |
| Inventive Example 4 | 0.33 | 0.25 | ⊚ | Excellent | 3.2 |
| Inventive Example 5 | 0.59 | 0.18 | ⊚ | Excellent | 3.5 |
| Inventive Example 6 | 0.48 | 0.21 | ⊚ | Excellent | 3.3 |
| Inventive Example 7 | 0.47 | 0.22 | ⊚ | Excellent | 3.3 |
| Inventive Example 8 | 0.53 | 0.13 | ⊚ | Excellent | 3.5 |
| Inventive Example 9 | 0.76 | 0.17 | ⊚ | Excellent | 4.2 |
| Inventive Example 10 | 0.05 | 0.45 | ○ | Excellent | 1.4 |
| Comparative Example 1 | 0.16 | >2 | ○ | Poor | 1.8 |
| Comparative Example 2 | 0.19 | 1.8 | ○ | Poor | 1.9 |
| Comparative Example 3 | — | — | X | Poor | 0 |
| Comparative Example 4 | 1.6 | 0.26 | ⊚ | Good | 13 |
| Comparative Example 5 | 0.02 | 1.2 | ○ | Poor | 0 |
| Comparative Example 6 | 2.5 | 0.5 | ⊚ | Good | 25 |
| Comparative Example 7 | 1.2 | 0.3 | ⊚ | Poor | 10 |
| Comparative Example 8 | 1.2 | 0.27 | ⊚ | Poor | 12 |
| Comparative Example 9 | 0.32 | 0.34 | X | Poor | 3.1 |
| Comparative Example 10 | 0.21 | 1.7 | ⊚ | Poor | 2.8 |

As illustrated in Tables 2 and 3, with respect to Inventive Examples 1 to 10 in accordance with the present invention, preplating was performed to obtain Fe coating weights ranging from 0.2 g/m² to 2 g/m² and the samples were then washed and dried. An air-fuel ratio in the direct flame furnace was adjust to be $(1100/(C^{0.09} \times T))+(100/T) \leq$ air-fuel ratio $\leq (1450/(C^{0.09} \times T))+(100/T)$ and the samples were heated from room temperature to a temperature ranging from 600° C. to 800° C. to oxidize a surface of a preplated layer. Thereafter, in a reduction process, the samples were heated in the radiant tube flame furnace under conditions including 20 ppm or less of oxygen, 1 vol % to 20 vol % of $H_2$, water vapor with a dew point of between −30° C. and 5° C., and $N_2$ as well as unavoidable gases as a remainder, and thus, Si, Mn, and Al in the base steel just under the preplated layer diffused into the preplated layer, but did not diffuse into the surface thereof due to a Fe oxide layer in the surface layer and formed oxides in the preplated layer. Since single or complex oxides composed of Si, Mn, and Al were not formed in the surface layer portion of the Fe-plated layer, plating surface qualities were excellent and plating adhesions were also excellent because oxides having a maximum length of 1 μm or less in a longitudinal direction were dispersed and distributed within 1 μm from the interface between the plating and the base (Fe preplating). Also, fractional reductions in tensile strength of the plated steel sheets were good at 4.2% or less. In addition, as illustrated in FIG. 4, it may be confirmed that surface qualities were excellent and internal oxides were formed.

In contrast, with respect to Comparative Example 1, direct flame furnace heating conditions, reduction furnace conditions, and plating bath temperature were included in the ranges limited in the present invention, but preplating was not performed. Oxides composed of Si, Mn, and Al, formed on the surface during oxidation heating in the direct flame furnace, is formed in a layer shape and Fe oxide was formed in an upper portion of the layer-shaped oxides and thus, oxides almost did not exist in the upper portion of reduced Fe as the Fe oxide was reduced after reduction annealing. Therefore, plating surface qualities were excellent and fractional reduction in tensile strength was relatively low at 1.8% as an internal oxidation depth was low at 0.16 μm. However, since the oxides under the reduced layer were included in a layer shape, delamination occurred at this region during bending.

With respect to Comparative Example 2, direct flame furnace heating conditions, reduction furnace conditions, and plating bath temperature were included in the ranges limited in the present invention, but Fe coating weight was lower than the range limited in the present invention. When the sample was oxidation heated in the direct flame furnace, Si, Mn, and Al easily diffused through thin preplated layer to form oxides composed of Si, Mn, and Al in a layer shape on the surface thereof and Fe oxide was formed in an upper portion of the layer-shaped oxides and thus, oxides almost did not exist in the upper portion of reduced Fe as the Fe oxide was reduced after reduction annealing. Therefore, plating surface qualities were excellent and fractional reduction in tensile strength was relatively low at 1.9% as an internal oxidation depth was low at 0.19 μm. However, since a maximum length of the oxide in a longitudinal direction under the reduced layer was greater than 1 μm, limited in the present invention, and the oxide was included in a layer shape, delamination occurred at this region during bending.

Also, with respect to Comparative Example 3, reduction furnace conditions and plating bath temperature were included in the ranges limited in the present invention, but Fe plating was not performed and the sample was heated in a non-oxidation atmosphere, because an air-fuel ratio in the direct flame furnace was lower than the range limited in the present invention. Si, Mn, and Al formed single or complex oxides composed of Si, Mn, and Al on the surface of the base steel, and the surface oxides continuously grew during subsequent reduction annealing to form relatively thick surface oxides, and thus, surface qualities were relatively poor due to poor wettability with respect to molten zinc and plating adhesion was also poor because adhesion between the oxides on the surface layer portion of the base steel and the plated layer was almost absent. Meanwhile, since the internal oxides were absent, tensile strength was not decreased.

In addition, with respect to Comparative Example 4, surface qualities of the plated steel sheet were relatively excellent, because Fe coating weight, reduction annealing conditions, and plating bath temperature satisfied the ranges limited in the present invention, and plating adhesion was also excellent, because a maximum length of internal oxides in a longitudinal direction was smaller than the range limited in the present invention. However, since an air-fuel ratio in the direct flame furnace was greater than the range limited in the present invention, oxidation was excessive. As a result, a thickness of the internal oxide layer after reduction and plating was greater than the range limited in the present invention and thus, fractional reduction in tensile strength was high at 13%.

With respect to Comparative Example 5, Fe coating weight, reduction annealing conditions, and plating bath temperature satisfied the ranges limited in the present invention, but heating temperature in the direct flame furnace was lower than the range of the present invention. An internal oxide layer from a surface layer portion of the base steel was excessively thin due to insufficient oxidation, and as a result, oxides were concentrated in a layer having a maximum length in a longitudinal direction greater than the range limited in the present invention and thus, plating adhesion was poor.

Also, with respect to Comparative Example 6, Fe coating weight, reduction annealing conditions, and plating bath temperature satisfied the ranges limited in the present invention, but heating temperature in the direct flame furnace was higher than the range of the present invention and an air-fuel ratio was also higher than the range limited in the present invention. Since oxidation was excessive, a thickness of an internal oxide layer after reduction and plating was higher than the range limited in the present invention, and thus, a fractional reduction in tensile strength was high at 18%.

In addition, with respect to Comparative Example 7, Fe coating weight, direct flame furnace oxidation conditions, and plating bath temperature satisfied the ranges limited in the present invention, but a hydrogen content in the reduction furnace was lower than the range of the present invention. Since reduction of an oxidation layer was insufficient, Fe oxide was formed between the plated layer and the base steel sheet after plating to generate delamination in the Fe oxide layer during processing, and an internal oxide was thick and thus, fractional reduction in tensile strength was relatively high at 10%.

With respect to Comparative Example 8, Fe coating weight, direct flame furnace oxidation conditions, and plating bath temperature satisfied the ranges limited in the present invention, but a hydrogen content in the reduction furnace was lower than the range of the present invention and maintaining time was short at 1 second. Since reduction of an oxidation layer was insufficient, Fe oxide was formed between the plated layer and the base steel sheet after plating to generate delamination in the Fe oxide layer during processing, and an internal oxide was thick and thus, fractional reduction in tensile strength was relatively high at 12%.

Further, with respect to Comparative Example 9, Fe coating weight, direct flame furnace oxidation conditions, and reduction annealing conditions satisfied the ranges limited in the present invention, but a plating bath temperature was lower than the range of the present invention. Since wettability of zinc in the plating bath was low, both surface quality and adhesion were poor.

With respect to Comparative Example 10, Fe coating weight, direct flame furnace oxidation conditions, hydrogen content of the reduction furnace, reduction annealing temperature, and plating bath temperature satisfied the ranges limited in the present invention, but a dew point in the reduction furnace was maintained lower than the range limited in the present invention. Since a maximum length of internal oxides in a longitudinal direction was greater than the range limited in the present invention, adhesion was poor.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a hot-dip galvanized steel sheet, the method comprising:
    preparing a base steel sheet;
    forming an iron-plated layer on the base steel sheet to form an iron-plated steel sheet;
    oxidation heating the iron-plated steel sheet at a temperature ranging from 600° C. to 800° C. to form a heated steel sheet;
    maintaining the heated steel sheet at a temperature ranging from 750° C. to 900° C. for 5 seconds or more in a reducing atmosphere with a dew point of between −30° C. to 5° C. to form a maintained steel sheet, the reducing atmosphere including 20 ppm or less of oxygen, 1 vol % to 20 vol % of $H_2$, and $N_2$ and unavoidable gases as a remainder, respectively based on a total volume of atmospheric gas;
    cooling the maintained steel sheet to form a cooled steel sheet; and
    dipping the cooled steel sheet in a hot-dip galvanizing bath to form the hot-dip galvanized steel sheet, wherein the oxidation heating is performed in a direct flame furnace by controlling an air-fuel ratio; and the air-fuel ratio is controlled as follows: $(1100/(C^{0.09} \times T))+(100/T) \leq$ air-fuel ratio $\leq (1450/(C^{0.09} \times T))+(100/T)$ where C is a coating weight (mg/m$^2$) of the iron-plated layer and T is a temperature (° C.) of the direct flame furnace, or wherein the oxidation heating is performed in a radiant tube flame furnace in an atmosphere having 5 vol % or less of H$_2$, 20 ppm or less of O$_2$ and N$_2$ as a remainder, respectively based on a total volume of atmospheric gas; and an oxygen content in an oxidation region in the radiant tube flame furnace is controlled as follows: $(4000/(C^{0.2} \times T^{0.08}))+(3500/T) \leq$ oxygen content (ppm) $\leq (5800/(C^{0.2} \times T^{0.08}))+(3850/T)$ where C is a coating weight (mg/m$^2$) of the iron-plated layer and T is a temperature (° C.) of the radiant tube flame furnace.

2. The method of claim 1, wherein the base steel sheet comprises: 0.3 wt % or less of carbon (C); and 1.0 wt % to 6.0 wt % of one or more of silicon (Si), manganese (Mn), and aluminum (Al).

3. The method of claim 1, wherein the base steel sheet comprises: one or more of chromium (Cr), nickel (Ni), copper (Cu), molybdenum (Mo), phosphorous (P), sulfur (S), antimony (Sb), titanium (Ti), niobium (Nb), and nitrogen (N), wherein each of the one or more is contained in an amount of 0.5 wt % or less.

4. The method of claim 1, wherein the coating weight is in a range of 0.2 g/m$^2$ to 2 g/m$^2$.

5. The method of claim 1, wherein the forming of the iron-plated layer is performed by using an electroplating method.

6. The method of claim 1, wherein a temperature of the hot-dip galvanizing bath is in a range of 440° C. to 480° C.

7. The method of claim 1, further comprising: heating the hot-dip galvanized steel sheet to a temperature ranging from 480° C. to 650° C.

\* \* \* \* \*